United States Patent [19]

Goddard et al.

[11] Patent Number: 4,704,220
[45] Date of Patent: * Nov. 3, 1987

[54] OIL-IN-ALCOHOL MICROEMULSIONS IN ANTIFREEZE

[75] Inventors: Errol D. Goddard, Haworth, N.J.; John L. Haack, Tittsford; Pak S. Leung, Highland Mills, both of N.Y.

[73] Assignee: First Brands Corporation, Danbury, Conn.

[*] Notice: The portion of the term of this patent subsequent to Aug. 18, 2004 has been disclaimed.

[21] Appl. No.: 869,262

[22] Filed: Jun. 5, 1986

Related U.S. Application Data

[63] Continuation-in-part of Ser. No. 754,732, Jul. 16, 1985, abandoned, which is a continuation-in-part of Ser. No. 680,756, Dec. 12, 1984, abandoned, which is a continuation-in-part of Ser. No. 633,207, Jul. 23, 1984, abandoned.

[30] Foreign Application Priority Data

May 29, 1985 [DE] Fed. Rep. of Germany ......... 519218

[51] Int. Cl.$^4$ ............................................. C09K 5/00
[52] U.S. Cl. ...................................... 252/75; 252/73; 252/78.5; 252/308; 252/312
[58] Field of Search .................. 252/73, 75, 70.5, 308, 252/312

[56] References Cited

U.S. PATENT DOCUMENTS

| | | | |
|---|---|---|---|
| 2,080,299 | 5/1937 | Benning et al. | 252/75 |
| 2,268,388 | 12/1941 | Funk | 252/75 |
| 2,349,338 | 5/1944 | Clapsadle et al. | 252/75 |
| 3,117,929 | 1/1964 | McCoy et al. | 252/75 |
| 3,341,469 | 7/1967 | Pines et al. | 252/389 |
| 4,337,161 | 6/1982 | Stayner | 252/49.5 |
| 4,371,447 | 2/1983 | Webb et al. | 252/73 |

FOREIGN PATENT DOCUMENTS 962351 7/1964 United Kingdom .

OTHER PUBLICATIONS

Groves et al., J. Pharm. Pharmacol. 1973, 25(9)736-40, (CA 80:72303a).
Prince, *Microemulsions Theory and Practice,* Academic Press, 1977.
Biais et al., Europhys. Conf. Abstr. 1980, 3F (Phys. Chem. Hydrodyn, 3 (PCH-80), 34-7, (CA 93: 101823w).
Robb, Ed., *Microemulsions,* Plenum Press, 1981.

*Primary Examiner*—Robert A. Wax
*Attorney, Agent, or Firm*—Gary L. Wamer

[57] ABSTRACT

Oil-in-alcohol microemulsion-containing composition concentrate stabilized by at least one emulsifier and containing at least one organic hydrophobizing agent having a metal adsorbing moiety therein. The composition concentrate, when diluted with water, is useful in automotive coolant systems as an antifreeze.

19 Claims, No Drawings

OIL-IN-ALCOHOL MICROEMULSIONS IN ANTIFREEZE

CROSS-REFERENCE TO RELATED APPLICATIONS

This application is related to the subject matter of co-pending U.S. application Ser. No. 595,421, filed on Mar. 30, 1984, and to concurrently filed U.S. application Ser. No. 633,445, filed on July 23, 1984. This application is a continuation-in-part of U.S. application Ser. No. 754,732, filed on July 16, 1985, now abandoned, which, in turn is a continuation-in-part of U.S. application Ser. No. 680,756, filed on Dec. 12, 1984, now abandoned, which, in turn, is a continuation-in-part of U.S. application Ser. No. 633,207, filed on July 23, 1984, now abandoned.

FIELD OF THE INVENTION

The present invention relates generally to an antifreeze concentrate, and, more particularly, to an antifreeze concentrate containing an oil-in-alcohol microemulsion.

BACKGROUND OF THE INVENTION

Macroemulsions for use in antifreezes are well known in the art. For example, ethylene glycol antifreeze compositions containing mineral oil plus an emulsifier or containing a barium sulfonate oil are well-known and were used commercially in automobiles up until the mid-1960's. The oil in these antifreezes provided excellent corrosion inhibition for the antifreezes by coating the metal surfaces of the coolant system with a so-called "magnetic film". However, in concentrate form, these emulsions are generally phase stable only for a very short period of time, e.g., perhaps two days or less, after which time they tend to separate into two phases.

With the advent of antifreeze overflow-tanks used to hold the volume expansion of antifreeze in a hot engine coolant system, these rather unstable macroemulsion antifreezes were replaced with other types of antifreezes, since a macroscopic two-phase antifreeze tends to congregte the less dense oil phase in the overflow-tank thereby depriving the remaining parts of the cooling system of this corrosion-inhibiting component. For the above described reasons, the concept of macroscopic two phase antifreezes is obsolete and current antifreezes are single phase, most notably the silicone-silicate stabilized antifreezes disclosed in U.S. Pat. Nos. 3,337,496 and 3,341,469.

In recent years, microemulsions have been developed which are known for their long-term storage stability, i.e. their ability to maintain an apparent single phase over an extended period of time. By way of illustration, oil-in-water microemulsions and water-in-oil microemulsions are extensively employed in the hydraulic fluid field. For example, U.S. Pat. No. 4,337,161 discloses oil-in-water microemulsions whereas U.S. Pat. No. 4,371,447 discloses water-in-oil microemulsions for use in hydraulic fluids, and the like.

Microemulsions, variously referred to as micellar solutions, "soluble oils", swollen micelles, etc., have been extensively discussed in the literature. See, for example, *Microemulsions*, I. D. Robb, Editor, Plenum Press (1981); and, *Microemulsions Theory and Practice*, L. M. Prince, Editor, Academic Press (1977). Microemulsions are typically characterized as clear, bright and transparent (and, hence, apparently homogeneous and microdispersed), whereas macroemulsions are visibly turbid and two phase. These characteristics are due to the fact that the particle (i.e. micro-droplet) in a microemulsion is typically smaller than the wave-length of visible light. Although clear to the eye, the presence of the microemulsion particles can be detected by instrumental light-scattering techniques.

As used herein, the term "microemulsion" is used in its broadest sense to encompass faintly turbid or opalescent composition as well as completely clear ones. All of these various types of microemulsions are characterized by excellent ambient temperature storage stability and particle sizes of about less than 0.1 micron. In contrast. macroemulsions are turbid in appearance (e.g., cow's milk) and tend to phase separate upon standing at ambient temperature.

Heretofore, microemulsions in antifreeze, as discussed above, were not known in the art to the best of our knowledge. We speculate that there are at least two reasons for this absence. First, if the antifreeze ingredients are in stable, microemulsion form, there is a problem as to how the corrosion-inhibiting components thereof will be made available to protect the metal surfaces of the car's coolant system. Second, a foaming problem is frequently encountered when using the high levels of emulsifier required to make a stable microemulsion. Such a foaming problem would be considered detrimental to a car's coolant system.

OBJECT OF THE INVENTION

It is the object of the present invention to provide an antifreeze composition concentrate characterized by advantageous storage stability and, upon dilution, providing an antifreeze that is microdispersed and apparently homogeneous at ambient (low) temperature and preferably two-phase at automotive engine operating (higher) temperature.

This and other objects will become apparent from a reading of the following detailed specification.

SUMMARY OF THE INVENTION

In one aspect, the present invention relates to an oil-in-alcohol microemulsion-containing antifreeze composition concentrate having a discontinuous phase and a continuous phase comprising:

(a) at least one alcohol, in an amount sufficient to form a continuous phase in the concentrate;

(b) alcohol-insoluble oil particles forming a discontinuous phase in said composition, said particles having a particle size less than about 0.1 micron (preferably less than about 0.05);

(c) at least one surface hydrophobizing compound selected from the group consisting of organic derivatives of the following: phosphate, sulfate, phosphonate, sulfonate, organoammonium and phosphonium salts, amine oxides, amphoteric and zwitterionic groups such as betaines and sulfobetaines and mixtures thereof; wherein the organic group is selected from the class consisting of the following radicals: alkyl, alkenyl, alkynyl, aryl, alkylaryl, arylalkyl, alkyleneoxy, polyalkyleneoxy, and combinations thereof; and.

(d) at least one emulsifier in an amount from zero up to an amount sufficient to stabilize the microemulsion in the composition. Moreover, in accordance with a further and preferred aspect of the present invention, the emulsifier or emulsifiers utilized are selected to provide the antifreeze with a cloud point of from about 40° C. to about 125° C. The resulting antifreeze possesses particularly preferred characteristics as will be described hereinafter.

Alternatively, the antifreeze composition concentrate of this invention can contain a surface hydrophobizing compound of a type, and present in an amount, which will impart adequate stability to the microemulsion. As will be described hereinafter, many such compounds will serve this additional function. Accordingly whether stability is imparted by the hydrophobizer or by a separate emulsifier or by a mixture thereof will depend upon the antifreeze system selected.

In another aspect, the present invention relates to an antifreeze composition. The antifreeze composition can be made from the composition concentrate by dilution of the concentrate with water and/or alcohol at the use site.

In yet another aspect, the present invention encompasses methods for making the above antifreeze composition, either by direct addition of the oil-in-alcohol microemulsion to water and/or alcohol, or by adding water and/or alcohol to the oil-in-alcohol microemulsion, or by pre-forming the composition concentrate.

DETAILED DESCRIPTION OF THE INVENTION

The compositions of the present invention are characterized by long term concentrate storage stability, as well as a visually single-phase characteristic at ambient (low) temperature and either a visually two-phase or microdispersed characteristic at operating engine (higher) temperatures in the automobile coolant systems (hereinafter also called "cooling systems"). The concentrate storage stability provides good "shelf-life" for the antifreeze concentrate during warehousing, bulk dispensing, and while on store shelves. The microdispersed, apparently homogeneous characteristic at ambient temperature makes it possible for the automotive "cooling system" overflow-tank to contain a uniform composition of all of the utilized antifreeze ingredients, thereby avoiding the congregation problems of the prior art macroemulsion-containing antifreezes when used in a cooling system having an overflow tank.

The preferred two-phase high temperature characteristic of the antifreezes of the present invention facilitates the coating of the metal surfaces of the automotive coolant system with at least a part of the oil portion of the microemulsion, thereby affording the same excellent corrosion inhibition characteristics for these metal surfaces as was afforded by the prior art macroemulsion-containing antifreezes. However, unlike the latter, the compositions of this invention can be used in the modern automobile coolant systems having a overflow-holding tank while maintaining a uniform distribution of the remaining portion of oil in the antifreeze coolant system, including the holding tank. In accordance with another aspect of this invention, the presence of hydrophobizer in the present composition enhances the affinity of the oil component for the metal surfaces, thereby enabling even the microdispersed oil in the microemulsion to provide corrosion protection.

The oil useful in the present invention can be any material known as an "oil". Thus, any of the numerous substances that are liquid or easily liquifiable by warming and are "practically insoluble" in the continuous phase of the present composition can be employed as the oil phase.

As used herein, the term "practically insoluble" means that the amount of oil present exceeds the ordinary solubility limit of the oil in the continuous phase of the composition at ambient temperature. It is preferred to utilize an oil which is completely insoluble in the continuous alcohol medium. Thus, it is believed that any dissolved oil will generally be less effective in providing the desired corrosion inhibition in comparison to that of the non-dissolved oil.

The oil useful in the present invention may be obtained from a wide variety of sources, including such diverse sources as animal, vegetable, mineral or synthetic manufacture. Moreover, the composition of the oil is also not critical; and it may be composed of such diverse materials as predominantly hydrocarbons, such as mineral and petroleum oils, fatty acid esters, fats, silicone oils, polyalkylene oxides and ester derivatives thereof, or mixtures thereof, and the like.

Based upon the above, the term "oil" is intended to include, but is not intended to be limited to, any organic compound which is practically insoluble in alcohol such as ethylene glycol or propylene glycol, or mixtures thereof, but which can be emulsified by the use of at least one surfactant. Such oils include non-polar and partially polar, aliphatic and aromatic materials, such as mineral oil, paraffin oil, vegetable oil, naphtha oil, petroleum base oil, mixed xylenes, kerosene, mineral spirit, transformer oil, fuel oil, silicone oil, silane esters, synthetic oil, halogenated oils, polypropylene glycols, propylene oxide/ethylene oxide copolymers, propylene oxide/butylene oxide copolymers, ethylene oxide/butylene oxide copolymers, ethylene oxide/propylene oxide/butylene oxide terpolymers, as well as sulfated, sulfonated, phosphated and phosphonated oils, higher alcohols and esters thereof, and the like.

It will be generally preferred to select an oil having a vapor pressure of less than 80 mm. of Hg at 25° C. Utilizing such an oil should minimize, in use, the amount of oil that is lost due to vaporization during the use of the antifreeze.

The amount of oil present in the microemulsions of the present invention can vary over a wide range, but is preferably between about 0.001 to about 5 (more preferably between about 0.1 and about 3) wt. percent based upon the total weight of the microemulsion. Within the above specified preferred ranges, the amount of oil used in the microemulsion is dependent upon the particular antifreeze end use required for the microemulsion. Below about 0.001 wt. percent, the amount of oil would generally be insufficient to be functional, whereas above about 5 weight percent the antifreeze may not satisfy governmental freezing point depression specifications for antifreeze.

As used herein, the term "continuous" or "outer" phase means the alcohol phase that extends through all parts of the microemulsion in a continuous fashion. This outer phase is to be distinguished from the particulate, discontinuous, inner oil phase. As is well recognized, the maximum packing fraction of uniform spheres would make it possible for the outer phase to be as small in amount as 26 vol. % based upon the total volume of both phases (which is about the same on a weight basis). Preferably, the outer alcohol phase comprises at least 50 wt. % (more preferably at least 90 wt. %) based upon the total weight of both phases.

The alcohols useful as the continuous (or outer) phase in the present invention include methanol, ethanol, propanol, butanol, ethylene glycol, diethylene glycol, propylene glycol, dipropylene glycol, glycerol, butylene glycol, the monoacetate of propylene glycol, the monoethylether of glycerol, the dimethyl ether of glycerol, alkoxy alkanols (such as methoxyethanol), and the like, and mixtures thereof. The preferred alcohol is selected from the group consisting of ethylene glycol, diethylene glycol, propylene glycol, dipropylene glycol and mixtures thereof.

As used herein, the term "hydrophobizing agent" denotes a compound that is adsorbed by, or adheres to, the metal surfaces of a cooling system and imparts an affinity between the thus-modified metal surfaces and the oil in the microemulsion. Useful hydrophobizing agents can accordingly be viewed as dual function compounds.

One end of the molecule attaches or anchors itself to the metal surfaces in the automotive cooling system. To provide long term effectiveness, the moiety selected should have temperature and chemical stability in the cooling system environment, viz.—should not be easily hydrolyzable or strippable from the surface.

The other end of the molecule of the hydrophobizing agent serves to attract the oil to the thus-coated surface to provide the requisite oil film that imparts the corrosion inhibition characteristics of the antifreeze composition concentrates of this invention. This end of the hydrophobizing agent molecule, typically an organic moiety, should satisfy the following criteria.

First of all, the organic moiety should desirably, and preferably, not result in undue coating of the metal surfaces, be this due to the oil or the hydrophobizer. Excessive build-up may result in less than optimum heat transfer characteristics, and such excessive build-up can be determined by measuring the heat transfer efficiency of the cooling system employed.

Secondly, the organic moiety should be sufficiently compatible with the particular oil so that the desired, protective oil film will result. Adequately compatible materials may be readily selected by ascertaining the contact angle between the oil particle and the coated surface. The contact angle, for suitably compatible materials, should be less than 90°, with lower contact angles being preferred, viz.—the lower the contact angle, the more readily will the desired oil film be provided.

Lastly, when an emulsifier is utilized, the organic moiety thereof should desirably have less affinity for a primary layer of the hydrophobizer adsorbed on the surface than to that of the oil particles, preferably substantially less attractiveness. The reason for this preference is that undue build-up of emulsifier on the coated metal surfaces can interfere with formation of the desired oil film, since the coated surface is thereby rendered hydrophilic, as well as perhaps adversely affecting the stability of the antifreeze composition. This criteria can be satisfied by selecting an organic moiety that is oleophilic in character and lacks homogeneity, as discussed hereinafter.

Accordingly, the organic moiety should preferably be one which lacks homogeneity. As used herein, the term "lacks homogeneity" denotes that the organic moiety has a branched chain, processed side chain, or has a random or non-uniform structure. Non-uniformity may be accomplished, for example, by modifying an alkyl chain by introduction of an alkyleneoxy chain, such as an ethyleneoxy chain. It is believed that employing a homogenous molecule might result in a tight packing into a crystal bi-layer, thereby impeding heat-transfer and/or oil film formation. Also, bi-layer-pairing of hydrophobizing agent molecules with resultant reduction in metal surface hydrophobicity can result if an excessive amount of hydrophobizer is used.

Useful hydrophobizing agents are selected from the group consisting of organic derivatives of the following: phosphate, sulfate, phosphonate, sulfonate, ammonium and phosphonium salts, amine oxides, phosphine oxides, amphoteric and zwitterionics such as betaines and sulfobetaines and mixtures thereof wherein the organic group is selected from the class consisting of the following radicals: alkyl, alkenyl, alkynyl, aryl, all having up to about 24 carbon atoms, alkyleneoxy, polyalkyleneoxy, and combinations thereof. In addition, when the emulsifier or emulsifiers are selected to provide the antifreeze with a cloud point within the range of from about 40° C. to about 125° C., more preferably from about 40° C. to about 100° C., the hydrophobizing agent can also be an organic derivative of a carboxylate.

Generally, the organophosphates useful in the present invention are identified by the structural formula:

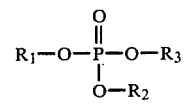

wherein each substituent $R_1$, $R_2$, and $R_3$ is selected from the class consisting of the following radicals: hydrogen; alkyl, aryl, alkenyl and alkynyl, with each of the foregoing having up to about 24 carbon atoms; alkyleneoxy, polyalkyleneoxy; phosphate or polyphosphate or their salts; and combinations thereof; with the proviso that at least one of said substituents is an organic radical within the class listed above or combinations thereof.

The preferred organophosphates have the structural formula identified above wherein at least one R substituent consists of an organic radical containing an alkylene oxide polymer or copolymer derivative of the form $R_4O\ (PO)_x(EO)_y(BO)_z$-, wherein the alkyleneoxide units may be either random or blocked and wherein $x>y>>z$ and $x+y+z \leq$ about 100, and $R_4$ is selected from the class of radicals: hydrogen; alkyl, aryl, alkenyl and alkynyl with the foregoing having up to about 24 carbon atoms; phosphates, polyphosphates and salts thereof, and combinations thereof. These organophosphates preferably have molecular weights below about 10,000 to insure solubility in the antifreeze composition. Antifreeze compositions incorporating these preferred hydrophobizing agents are the subject of commonly-assigned co-pending U.S. application Ser. No. 633,210.

Preferred hydrophobizing agents are the organophosphates identified by structural formulae I to III, including the free acids and salts thereof, together with mixtures thereof:

 (I)

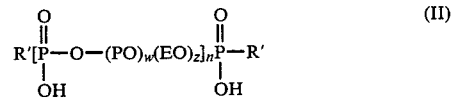 (II)

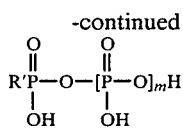

wherein
R'=[RO(PO)$_x$(EO)$_y$]wherein R=H or alkyl, aryl, alkylaryl or arylalkyl having up to 24 carbon atoms
PO=Propylene oxide radical
EO=Ethylene oxide radical
x=1 to 100
y=0 to 50
k=1 to 3, with the proviso that k can be 3 if at least one R' group is removed from the phosphate ester by hydrolysis prior to, or during, use
n=1 to 100
w=0 to 100, with the proviso that if w $\geq$ 1, than x can be zero
z=0 to 50
m 1 to 10

Within a given formula x, y, w or z group is the same or different number.

Typical useful classes of organophosphates falling within the groups identified by structural formulae I through III above, are identified as follows:

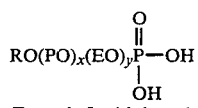

Formula I with k = 1

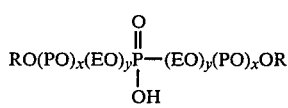

Formula I with k = 2

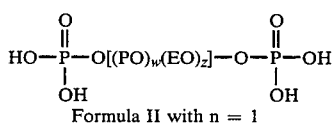

Formula II with n = 1
x = 0
y = 0
R = H

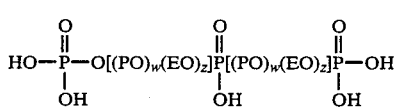

Formula II with n = 2
x = 0
y = 0
R = H

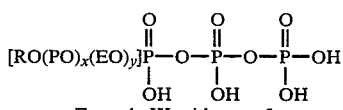

Formula III with m = 2

Other less preferred hydrophobizers are organic derivatrives of: a sulfonate, such as barium alkyl benzene sulfonate; a phosphonate, such as dodecyl phosphonate; a carboxylate, such as a carboxylic acid grafted on an polyalkylene glyocl; an organoammonium salts, such as cetyltrimethylammonium chloride, etc.

The amount of hydrophobizing agent, which is dispersed in the present invention, can vary over a wide range, but is preferably between about 0.001 and about 30 (more preferably between about 0.005 and about 1) wt. percent, based upon the total weight of the microemulsion. Below about 0.001 wt. percent, the amount of hydrophobizing agent would generally be insufficient to be effective, whereas above about 30 percent, the hydrophobizer is expected to provide no further significant hydrophobizing benefits.

Certain hydrophobizers will perform a dual role in not only providing an affinity between the engine cooling system metal surfaces and the oil in the microemulsion but also can serve as an emulsifier for the microemulsion. Indeed, with the possible exception of the non-ionics, each class of emulsifiers for the microemulsion described herein includes specie capable of also acting as a hydrophobizer. Many factors will dictate whether a separate emulsifier or emulsifiers should be used, including cost, adequacy of stability, and forming considerations. If the emulsifying role is not considered adequately performed by the hydrophobizer, then a separate emulsifier should be utilized.

The emulsifiers useful in the present invention include any of a wide range of anionic surfactants, such as the organophosphates, phosphonates, sulfates and sulfonates, as well as salts of fatty acids; cationic surfactants such as organoamuonium and phosphonium salts; and non ionic surfactants such as alkoxylated alcohols, phenols, and amines, and fatty acids, and the like; and amphoteric and zwitterionic groups such as betaines and sulfobetaines, that are well-known in the art. Yet another group of surfactants useful as emulsifiers would include alkyl amine oxides, alkyl phosphine oxides, and the like. Certain inorganic compounds known to be active as emulsifiers, such as soluble borate and phosphate salts, can be employed as emulsifiers in the present invention.

The above emulsifiers can be used singly or in combination as illustrated in the Examples given below. A combination of at least two surfactants is preferred in order to facilitate microemulsification and thereby reduce or minimize the total emulsifier requirement. Also, water in low concentrations is optionally used to enhance the stability of the microemulsions, preferably in an amount of less than 10 weight percent based upon the weight of the microemulsion.

Preferably, although a composition without a cloud point is also useful, at least one emulsifier employed in the compositions of the present invention provides the antifreeze with a "cloud point", viz.—the antifreeze exhibits reverse temperature solubility. Thus, it is preferred to employ at least one emulsifier which provides a cloud point for the antifreeze at between about 40° C. and about 125° C., more preferably between about 40° C. and 100° C., even more preferably between 65° C. and 125° C., and most preferably between 65° C. and 90° C. The lower limit of 40° C. is well above ambient temperature, whereas the upper limit of 125° C. is generally below automotive engine temperatures.

The existence of this cloud point makes it possible for the emulsifier possessing this property to "break" the microemulsion when the microemulsion temperature rises to its cloud point temperature range in the hot portions of an operating engine coolant system, thereby allowing the oil to coat the metal surfaces with which it comes in contact. More particularly, it is believed that the "breaking" of the microemulsion provides, in effect, a driving force that allows the oil to more readily coat the metal surfaces.

In cooler portions of the engine coolant system, for example, in the overflow-tank, and below the cloud point temperature range of the emulsifier selected, the composition will be in microemulsion or stable dispersed macroemulsion form. Re-microemulsification of the antifreeze composition components in the various portions of the engine coolant system takes place when the engine is not operating, and thus allowed to cool down so that the antifreeze temperature drops below its cloud point.

The preferred emulsifiers for use in the present invention are the non-ionic surfactants. These are preferred because they are generally low foaming and generally provide favorable cloud point temperatures for the antifreeze. Further, non-ionic surfactants are preferred since the use of such surfactants should eliminate or at least minimize any unfavorable reaction or association with the complex system, typically ionic in character, that is present in an automotive cooling system.

In general, the total emulsifier concentration present in the microemulsion (viz.—the total concentration of the emulsifier plus the concentration of any hydrophobizing agent if it serves as an emulsifier) should be between about 0.1 times and about 100 times (preferably between about 0.5 times and about 50 times, more preferably between about 2 and about 10 times) the concentration of oil present in the microemulsion, with the proviso that the total amount of oil plus emulsifier and alcohol cannot exceed 100 wt. percent of the microemulsion. If the surfactant concentration is below about 0.1 times the oil concentration, the microemulsion is likely to be unstable. If the surfactant concentration is above about 100 times the oil concentration, it is likely that resulting composition will not be economically feasible from a commercial standpoint.

The antifreeze concentrate of the invention preferably has a pH of between about 5.5 and about 11 in order to provide a working antifreeze pH of between about 8 and about 11. However, the particular pH selected for the working antifreeze may be varied as desired. It should, of course, be appreciated that the working pH selected may affect the adherency or substantivity of the hydrophobizer coating on the metal surfaces. The efficacy of the particular working pH for the hydrophobizer selected may be readily ascertained.

Buffers can be included in the concentrate to provide this pH range, and a wide variety of buffers are known and have been used in antifreeze compositions. As representative examples, suitable buffers include, but are not limited to, borates, phosphates, dibasic acids, such as sebacates and benzoates, hydroxy benzoates, carbonates, bicarbonates, or mixtures thereof. If used, the buffer is preferably employed in an amount of between 0.1 and about 5 wt. percent based upon the weight of the concentrate. Below about 0.1 wt. percent, the buffer would not be expected to be effective, whereas above about 5 wt. percent, the amount of buffer is expected to be too costly for a commercial antifreeze.

Other optional additives may be employed in minor amounts of less than 50 wt. percent based on the weight of the concentrate. Typical optional additives would include, for example, known corrosion inhibitors for aluminum or other metals in admixture with the oils and the hydrophobizing agents of the present invention such as, for example, molybdates, sebacates, carbonates, silicates, alkali metal nitrates, alkali metal nitrites, diisopropylamine nitrite, dicyclohexylamine nitrate, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide a measurable amount of corrosion inhibition with respect to the metal (e.g. copper, steel, brass, aluminum, cast iron, solder etc.) surfaces to be protected as compared to the antifreeze without these inhibitors.

In accordance with one aspect of this invention, the type of optional corrosion inhibitor that may be employed is much broader than can be used in conventional antifreeze compositions due to the fact that, pursuant to this invention, oil soluble inhibitors may be readily utilized. Such inhibitors may be dissolved in the oil, for example, prior to forming the microemulsion. In this fashion, the oil particles are expected to serve as an advantageous carrier medium to transport such corrosion inhibitors to the metal surfaces. These oil-soluble corrosion inhibitors are preferred in the practice of this invention.

In similar fashion, the oil phase can be employed to serve as a carrier for other useful types of additives. As illustrative examples, oil soluble biocides, oxidation inhibitors, taste repellants, and the like may be advantageously utilized.

Other typical optional additives that may be used include wetting agents and surfactants such as, for example, known ionic and non-ionic surfactants such as the poly(oxyalkylene) adducts of fatty alcohols; defoamers and/or lubricants such as the well-known polysiloxanes and the polyoxyalkylene glycols, oil-soluble inhibitors, such as zinc dithiophosphates and zinc dithiocarbamates, lubricants such as silicone pump lubricants, as well as any other minor ingredients known in the art that do not adversely affect the antifreeze characteristics sought to be achieved.

One minor additive that is particularly preferred is a defoamer in view of the substantial quantities of emulsifier often employed in the concentrate of the present invention. More particularly, the quantities of emulsifier utilized to provide the microemulsion with the desired stability can cause undesirable foaming in the cooling system. If such foaming occurs, this may be satisfactorily minimized by utilizing a defoaming agent.

A variety of such defoamers are known and may be used. A particularly preferred defoamer is commercially available under the trademark "SAG" (a silicone defoamer product of Union Carbide) and is preferably employed in amounts of less than 0.5 wt. percent based upon the weight of the microemulsion in the antifreeze. An appropriate defoamer should meet the following criteria (a) good storage stability in the antifreeze concentrate at ambient temperature and, (b) it will not adversely affect the action of the hydrophobizer or emulsifier.

The microemulsions of the present invention can be prepared by any known method such as, for example, by mixing the individual components together for a short period of time. Another procedure for preparing microemulsions is to heat a mixture of the individual ingredients, while stirring, and then allow the resulting microemulsion to cool to room temperature. The sequence of addition of the oil, alcohol, and surfactant to the microemulsion mixture is not critical; and the order most convenient may be selected. Procedures for preparing microemulsions are well-known in the art and are more fully described, for example, in "Microemulsion Theory and Practice", Leon M. Prince, Editor (Academic Press, Inc. 1977), the disclosure of which is incorporated herein by reference.

If desired, the antifreeze concentrate of this invention may be utilized in combination with other antifreeze concentrates. For example, the antifreeze concentrates of the present invention may be utilized with state-of-the-art antifreeze compositions. U.S. Pat. No. 3,337,496 is representative of this type of technology.

The following Examples are intended to illustrate, but in no way limit, the scope of the present invention.

EXAMPLE 1

A. Preparation of microemulsion-containing antifreeze concentrate and working antifreeze solutions This Example illustrates the preparation and use of an antifreeze concentrate of this invention. The inhibitory effect of such concentrate is compared to a control.

An oil-in-alcohol microemulsion was prepared by mixing a formulation consisting of 0.2 wt. % paraffin oil, 0.2 wt. % TERGITOL NP-4 (a nonylphenol ethoxylate surfactant of Union Carbide Corporation having 4 average ethoxy units per molecule), and 1.67 wt. % TERGITOL 25-L-7 (a surfactant product of Union Carbide comprising ethoxylates of linear alcohols having an average number of carbons between 12 and 15 and having an average of 7 ethoxy groups per molecule) and 0.5 wt. percent of GAFAC RB-400, an ethoxylated alkyl phosphate of GAF Corporation, together in a borate-containing ethylene glycol base fluid (hereinafter Base Fluid A). Base Fluid A (hereinafter "Test Solution #2'''") had the following composition:

| BASE FLUID A | |
|---|---|
| COMPONENT | WT. % |
| ethylene glycol | 98.26 |
| sodium tetraborate pentahydrate | 1.47 |
| sodium hydroxide (50% aq.) | 0.27 |
| Total wt. % | 100.0 |

The resulting composition was clear and bright in appearance. This microemulsion concentrate was diluted to make a working antifreeze solution (identified as "Test Solution #1" in Table I) by mixing 33 wt. % of concentrate with 67 wt. % of "corrosive water" (deionized water containing 100 ppm. each of $SO_4^=$, $HCO_3^-$ and $Cl^-$, all added as the Na salts). The antifreeze solution was clear and bright in appearance.

B. Laboratory Disc Heat Flux Test: Method, Apparatus and Results

A standard test method used in the antifreeze industry was employed to determine the inhibitory effect of the formulated composition of the present invention with respect to heat rejecting aluminum surfaces. This test method is described in Corrosion, 15,257t at 258t (1959) "Laboratory Methods for Determining Corrosion Rates Under Heat Flux Conditions", and also in an ASTM publication entitled, "Engine Coolant Testing: State of the Art," a symposium sponsored by ASTM Committee D-15, at pages 17–19 (Printed, May 1980), both incorporated herein by reference.

The following summarizes the test equipment and procedure used:

The apparatus consisted of a one liter flask, fitted with a condenser, a thermometer, a cold finger, a temperature controller, a 1½ inch diameter ×¼ inch thick No. 319 aluminum casting alloy (herein "the aluminum disc"), and a soldering iron heat source.

The apparatus was charged with 900 ml. of the working antifreeze solution and heated to effect boiling at the aluminum disc surface and to maintain a solution temperature of about 80° C. The microemulsion in the antifreeze solution had a cloud point below 80° C. The test duration was 168 hours. The weight loss of aluminum from the aluminum disc was determined and used as a measure of corrosion inhibitor effectiveness expressed as % inhibition.

The results are given in Table I:

TABLE I

| Test Solution # | % Inhibition | Wt. Loss |
|---|---|---|
| 1 | 95% | 3 mg. |
| 2 (control) | 0% | 60 mg. |

The results presented in Table I above show very good corrosion inhibition associated with Test Solution #1 of the present invention, as compared to control Test Solution #2 (BASE FLUID only) (95% versus 0% inhibition, respectively).

EXAMPLE 2

This Example illustrates the effectiveness of another microemulsion antifreeze concentrate of this invention, which concentrate does not have a cloud point.

The above disk test was repeated on a formulation of this invention consisting of 0.5 wt. % of a single surfactant, GAFAC RB-400, and 0.1% transformer oil (i.e., refined mineral oil having a viscosity of 57 S.S.U. at 100° F., added as transformer oil #600, a product of Texaco Corp.) in the above described BASE FLUID A, and then diluted with corrosive water as described in Example 1 above.

This formulation provided 95% inhibition on the disk test. In contrast, analogous compositions without transformer oil or without transformer oil and RB-400 (control) provided 0% inhibition.

EXAMPLE 3

GLASSWARE CORROSION TEST OF MICROEMULSION CONTAINING ANTIFREEZE ON METAL SPECIMENS

This Example shows the corrosion inhibiting characteristics achieved using yet another antifreeze concentrate of the present invention having a conventional, supplemental corrosion inhibitor.

An oil-in-alcohol working antifreeze solution was prepared using the following formulation: 0.067 wt. % paraffin oil, 0.067 wt. % "TERGITOL NP4", 0.1 wt % "TERGITOL 25-L-7", 0.04 wt. % "GAFAC RB400", 31.95 wt. % ethylene glycol, 1.26 wt. % sodium metaborate octa hydrate, 0.12 wt. % sodium mercaptobenzothiazole and 66.4 wt. % corrosive water containing 100 ppm $SO_4^=$, $HCO_3^-$, $Cl^{31}$ in Na salt. This formulation appeared opalescent.

The resulting working antifreeze was tested, using the ASTM Glassware test procedure (ASTM-D-1384). This is a beaker test procedure whereby metal specimens are immersed in 180° F. heated antifreeze for 336 hours, and metal weight lost due to corrosion during immersion is measured. As a control, a borate-containing ethylene glycol base fluid without oil and surfactant, but containing the other specified ingredients was employed.

The results are given in Table II (the values being set forth being an average of 3 samples):

TABLE II

| ASTM-D-1384 (mgs. wt. loss per 1 inch × 2 inch specimen) | | | | | | |
|---|---|---|---|---|---|---|
| Cast | | Steel | Br | ASTM Solder | Cu | Additional Specimen High-Lead Solder |
| Al | Fe | | | | | |
| microemulsion | 19 | 1 | 2 | 7 | 6 | 6 | 16 |
| control | 63 | 1 | 3 | 7 | 5 | 8 | 82 |

The above results show that the microemulsion composition provides improved aluminum and high-lead solder corrosion inhibition, as compared to the control borate buffer composition. Results for ASTM solder, copper, brass and steel are considered to be comparable.

EXAMPLE 4

PREPARATION OF ADDITIONAL MICROEMULSION CONTAINING ANTIFREEZES OF THE PRESENT INVENTION

This Example describes the preparation of other antifreeze concentrates pursuant to the present invention, utilizing various oils and hydrophobizers.

Table III below provides data on various microemulsions which were prepared. These microemulsions are suitable for use in the antifreeze concentrates of the present invention.

Additional microemulsion-containing antifreezes were made using Base Fluid A (identified in Example 1) to which was added the various oils and hydrophobizers identified in Table III. Examination of each of the mixtures described in Table III showed them to have the characteristics of a microemulsion.

EXAMPLE 5

CAR TESTS ON MICROEMULSION CONTAINING ANTIFREEZE WITH VARIOUS CLOUD POINTS

This Example illustrates the use of microemulsion antifreeze concentrates of this invention in an automobile cooling system.

A 1982 Chevrolet Citation automobile, equipped with a V 6 engine and having a 10.6 liter nominal cooling system and a thermostat set at 195° F., was tested as follows. The car coolant system was filled with a 50:50 volume mixture of antifreeze Concentrate Y and tap water, where antifreeze Concentrate Y is defined in Table IV below:

TABLE IV

| ANTIFREEZE CONCENTRATE Y | |
|---|---|
| Components of Concentrate Y | Wt. % |
| Ethylene Glycol | 92.2693 |
| Transformer Oil | 0.9975 |
| TERGITOL NP-4* | 0.9975 |
| TERGITOL 25-L-12* | 3.7406 |
| Water, distilled | 1.9950 |
| | 100.0000 |

*defined in Example 1A above.

This antifreeze concentrate exhibited a cloud point of about 77° F.

The car containing the above aqueous antifreeze was tested over an 11 day period by cycling the engine 39 times (i.e., starting the engine, running it for several minutes, then cooling it) and driving the car over 303 miles. The original 50 percent aqueous antifreeze had an oil-containing phase of 12.7 volume percent.

After 24 engine on-off cycles, the oil-containing phase in the overflow-tank of the coolant system was 12.5 volume percent. After 32 cycles, the overflow-tank had an oil phase content of 10.8 volume percent, as

TABLE III

| VARIOUS OILS IN MICROEMULSION-CONTAINING ANTIFREEZES | | | | | | | | |
|---|---|---|---|---|---|---|---|---|
| OIL | | HYDROPHOBIZER | | BASE FLUID A | SURFACTANT 1 | | SURFACTANT 2 | |
| TYPE | AMOUNT IN GRAMS | TYPE | AMOUNT IN GRAMS | AMOUNT IN GRAMS | TYPE | AMOUNT IN GRAMS | TYPE | AMOUNT IN GRAMS |
| Corn Oil | 1 | None | — | 20 | TERGITOL NP4* | 1 | TERGITOL 25L7 | 4.4 |
| Mineral Oil** | 0.075 | Barium Sulfonate** | 0.02 | 20 | TERGITOL NP4* | 0.1 | TERGITOL 25L7 | 1.1 |
| Paraffin Oil | 0.1 | Grafted UCON Fluid*** | 0.1 | 20 | TERGITOL NP4* | 0.1 | TERGITOL 25L7* | 2 |
| Transformer Oil | 0.1 | GAFAC RB 400* | 1.1 | 20.7 | ANTARA LE 500**** | 0.1 | — | — |
| Paraffin Oil | 1 | None | — | 13.2 | TERGITOL NP4* | 1 | TERGITOL 25L7* | 4.8 |

Defined in Example 1A above.
*Added as 0.1 wt. % Bryton Oil which contains 20% Ba alkyl benzene sulfonate, 5.2% BaCO₃ and 74.8% mineral oil.
**Union Carbide's "UCON 50HB170" polyoxyalkylene polymer grafted with 10% acrylic acid
***A polyethyleneoxy-based phosphate ester with aromatic hydrophobe, a product of GAF Corporation.

Each of the microemulsions identified in Table III above are clear and stable compositions. This Example demonstrates that microemulsion-containing antifreeze compositions can be made using various oils (corn oil, mineral oil, paraffin oil, transformer oil). With regard to the corn oil, a microemulsion was made; and, a hydrophobizer can be provided, as shown for the other oils, to make the corn oil useful within the scope of the present invention.

compared to an oil phase content of 10.5 volume percent in the bulk engine fluid. After 39 cycles, the overflow-tank had an oil-containing phase of 10.8 volume percent, whereas the oil phase content of the bulk engine fluid was 10.6 volume percent.

The above test results indicate clearly that an oil content equilibrium between the bulk engine fluid and the overflow-tank was reached after a number of on-off cycles of the engine and that a microemulsion-containing antifreeze having a cloud point of 77° C. did not aggregate the oil phase in either the main coolant system or in the overflow-tank. Re-microemulsification of the antifreeze took place in the cooling system after the antifreeze returned to below its cloud point.

A similar car test was conducted using an antifreeze composition having a cloud point of about 60° C. Complete re-microemulsification of this antifreeze in the coolant system did not take place when the system was cooled down. Also, the oil distribution in the antifreeze was not uniform in the various parts of the system on cool down. However, while not optimum, the performance of this composition would be considered to be adequate when employed in an automobile cooling system having no overflow tank, such as the Ford Mustang.

In summary, this Example illustrates the advantage of selecting a microemulsion with a cloud point of at least about 65° C. when using a cooling system with an overflow-tank, and at least 40° C. when no overflow-tank is used, with the compositions of the present invention in accordance with the method of use described in this Example. The above-described cooling method is not our invention, but rather is the invention of Goddard et al as claimed in their co-pending U.S. application Ser. No. 633,445, filed July 23, 1984.

EXAMPLE 6

PREPARATION AND TESTING OF AN ANTIFREEZE CONTAINING AN OIL-SOLUBLE CORROSION INHIBITOR

This Example shows the corrosion-inhibiting performance of yet another microemulsion antifreeze concentrate of the present invention.

The disk test (described in Example 1) was repeated on a formulation of this invention consisting of 0.59 wt. % of a solution of 10 wt. % of an oil-soluble corrosion inhibitor, namely AMINE 0, an oleylimodazoline product of Ciba-Geigy, in paraffin oil, 0.59 wt. % TERGITOL NP-4, 0.89 wt. % TERGITOL 25-L-7, 0.35 wt. % GAFAC RB-400 and 97.5 wt. % BASE FLUID A, described above, diluted with "corrosive" water as also described in Example 1. This formulation provided 100% inhibition on the disk test. In contrast, a control example using BASE FLUID A provides 0% inhibition.

While this invention has been described with reference to certain specific embodiments, it will be recognized by those skilled in this art that many variations are possible without departing from the scope and spirit of the invention and that it is intended to cover all changes and modifications of the invention disclosed herein for the purposes of illustration which do not constitute departure from the spirit and scope of the invention.

We claim:

1. An oil-in-alcohol microemulsion-containing antifreeze composition concentrate having a discontinuous phase and a continuous phase comprising:
   (a) at least one alcohol in an amount sufficient to form a continuous phase in the concentrate;
   (b) alcohol-insoluble oil particles forming a discontinuous phase in said composition, said particles having a particle size less than about 0.1 micron;
   (c) at least one hydrophobizing compound selected from the group consisting of organic derivatives of the following: phosphate, sulfate, phosphonate, sulfonate, ammonium and phosphonium salts, amine oxides, phosphine oxides, amphoteric and zwitterionic groups such as betaines and sulfobetaines, and mixtures thereof wherein the organic group is selected from the class consisting of the following radicals: alkyl, alkenyl, alkynl, aryl, all having up to about 24 carbon atoms, alkyleneoxy, polyalkyleneoxy, and combinations thereof; and
   (d) at least one emulsifier present in an amount from zero up to an amount sufficient to stabilize the microemulsion in the composition.

2. The concentrate of claim 1 wherein said emulsifier provides a cloud point for the antifreeze between 40° C. and 125° C.

3. The concentrate of claim 1 wherein said alcohol is selected from the group consisting of ethylene glycol, propylene glycol, diethylene glycol, dipropylene glycol, and mixtures thereof.

4. The concentrate of claim 3 wherein said oil particles are present in an amount of between about 0.001 and about 5 wt. percent based on the total weight of the microemulsion, and wherein said emulsifier is present in an amount of between about 0.1 times and about 100 times the total weight of said oil particles in the microemulsion, and wherein said alcohol is present in an amount of at least about 50 wt. percent based on the weight of the concentrate, and wherein the hydrophobizer is present in an amount of between about 0.001 and about 30 weight percent based on the weight of the microemulsion, with the proviso that the total weight of the concentrate not exceed 100 wt. percent.

5. The concentrate of claim 3 wherein said emulsifier consists essentially of non-ionic, anionic or cationic surfactants, or mixtures thereof.

6. The concentrate of claim 3 wherein said emulsifier consists of a mixture of at least two non-ionic surfactants.

7. The concentrate of claim 1 wherein said insoluble particles have an average particle size of less than about 0.05 microns.

8. The concentrate of claim 1 wherein component (c) is a propylene oxide or ethylene oxide/propylene oxide-containing organophosphate ester.

9. The concentrate of claim 8 wherein said organophosphate ester has an average molecular weight below about 10,000.

10. The concentrate of claim 1 wherein said organophosphate ester has the structural formula:

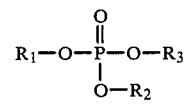

wherein each substituent $R_1$, $R_2$, and $R_3$ is selected from the class consisting of the following radicals: hydrogen; alkyl, aryl, alkenyl and alkynyl, with each of the foregoing having up to about 24 carbon atoms; alkyleneoxy, polyalkyleneoxy; phosphate or polyphosphate or their salts; and combinations thereof; with the proviso that at least one of said substituents is an organic radical within the class listed above or combinations thereof.

11. The concentrate of claim 1 having a pH of between about 5.5 and about 11.

12. The concentrate of claim 1 having a pH of between about 8 and about 11.

13. The concentrate of claim 1 which additionally contains silicate in a corrosion-inhibiting effective amount.

14. The concentrate of claim 1 which additionally contains an antifoam additive in an amount effective to minimize foaming of said concentrate.

15. The concentrate of claim 3 wherein said oil particles are present in an amount of between about 0.1 and about 3 wt. percent based on the total weight of the microemulsion, and wherein said emulsifier is present in an amount of between about 0.5 times and about 50 times the total weight of said oil particles in the microemulsion, and wherein said alcohol is present in an amount of at least about 90 wt. percent based on the weight of the concentrate, and wherein the hydrophobizer is present in an amount of between about 0.005 and about 1 weight percent based on the weight of the microemulsion, with the proviso that the total weight of the concentrate not exceed 100 wt. percent.

16. A method of using the concentrate of any of claims 1 to 15 which comprises diluting the concentrate with water or a mixture of water and alcohol to make a working antifreeze and adding said working antifreeze to an automobile cooling system.

17. An antifreeze composition comprising the concentrate of any of 1 through 15, and additionally containing water and/or alcohol in an amount sufficient to provide a diluted antifreeze having a pH of between about 8 and about 11.

18. The concentrate of any of claims 1 through 15 which additionally contains an oil-soluble corrosion inhibitor in said discontinuous phase.

19. An oil-in-alcohol microemulsion containing antifreeze composition concentrate having a discontinuous phase and a continuous phase comprising:
 (a) at least one alcohol in an amount sufficient to form a continuous phase in the concentrate;
 (b) alcohol-insoluble oil particles forming a discontinuous phase in said composition, said particles having a particle size less than about 0.1 micron;
 (c) at least one hydrophobizing compound selected from the group consisting of organic derivatives of the following: phosphate, sulfate, phosphonate, sulfonate, carboxylate, ammonium and phosphonium salts, amine oxides, phosphine oxides, amphoteric and zwitterionic groups such as betaines and sulfobetaines, and mixtures thereof wherein the organic group is selected from the class consisting of the following radicals: alkyl, alkenyl, alkynl, aryl, all having up to about 24 carbon atoms, alkyleneoxy, polyalkyleneoxy, and combinations thereof; and
 (d) at least one emulsifier present in an amount from zero up to an amount sufficient to stabilize the microemulsion in the composition said emulsifier providing a cloud point for the antifreeze of from about 40° C. to about 125° C.

* * * * *

UNITED STATES PATENT AND TRADEMARK OFFICE
CERTIFICATE OF CORRECTION

PATENT NO. : 4,704,220

DATED : November 3, 1987

INVENTOR(S) : Errol D. Goddard, et al.

It is certified that error appears in the above-identified patent and that said Letters Patent is hereby corrected as shown below:

Column 7, line 66 - delete "which is dispersed in the present invention" and substitute therefor --which is dispersed in the present microemulsion composition of the present invention--.

Column 9, line 66 - after first occurrence of "alkali metal nitrates," delete the second occurrence of "alkali metal nitrates".

Column 12, line 60 - replace "Cl$^{31}$" with "Cl$^-$".

Column 13, line 55 - insert --*-- before word "Defined".

line 56 - insert one additional --*-- before word "Added".

line 57 - insert one additional --*-- before word "Union".

line 58 - insert one additional --*-- before word "A"

Column 14, line 49 - following "25L7" insert --*--.

line 51 - following "25L7" insert --*--.

Signed and Sealed this

Seventh Day of June, 1988

Attest:

DONALD J. QUIGG

Attesting Officer

Commissioner of Patents and Trademarks